(12) United States Patent
Zicher et al.

(10) Patent No.: US 12,737,945 B2
(45) Date of Patent: Sep. 15, 2026

(54) GENERATING A GROUP PHOTO THAT INCLUDES A PHOTOGRAPHER

(71) Applicant: Google LLC, Mountain View, CA (US)

(72) Inventors: Adi Zicher, Mountain View, CA (US); Assaf Zomet, Mountain View, CA (US); Maayan Rossmann, Mountain View, CA (US); Jung-Chen Hung, Mountain View, CA (US); Or Guz, Mountain View, CA (US); Jay Tenenbaum, Mountain View, CA (US); Avram Golbert, Mountain View, CA (US); Yaron Brodsky, Mountain View, CA (US); Fuhao Shi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 70 days.

(21) Appl. No.: 18/787,384

(22) Filed: Jul. 29, 2024

(65) Prior Publication Data

US 2026/0030806 A1 Jan. 29, 2026

(51) Int. Cl.
*G06T 11/60* (2026.01)
*G06T 5/50* (2006.01)
(Continued)

(52) U.S. Cl.
CPC ................ *G06T 11/60* (2013.01); *G06T 5/50* (2013.01); *G06T 5/60* (2024.01); *G06T 5/77* (2024.01);
(Continued)

(58) Field of Classification Search
CPC ........ H04N 23/635; H04N 23/64; G06T 5/50; G06T 5/60; G06T 5/77; G06T 7/11;
(Continued)

(56) References Cited

U.S. PATENT DOCUMENTS 7,221,395 B2 * 5/2007 Kinjo .................. H04N 13/286 348/E13.008
7,423,671 B2 * 9/2008 Kiso ................... H04N 23/698 358/450
(Continued)

FOREIGN PATENT DOCUMENTS

WO 2024041394 A1 2/2024

*Primary Examiner* — Lin Ye
*Assistant Examiner* — Chriss S Yoder, III
(74) *Attorney, Agent, or Firm* — McDonnell Boehnen Hulbert & Berghoff LLP

(57) ABSTRACT

A user device receives a request to generate a composite image. The media application a first image that includes one or more first subjects. The media application determines a previous pose of the user device associated with capture of the first image. The media application segments the one or more first subjects from the first image. The media application generates one or more overlays that correspond to the one or more first subjects based on segmenting the one or more first subjects. The media application displays the one or more overlays on a viewfinder of the user device to provide guidance for a user to capture a second image based on a comparison of a current pose of the user device to the previous pose of the user device. The media application generates the composite image.

17 Claims, 11 Drawing Sheets

(51) Int. Cl.

| | |
|---|---|
| ***G06T 5/60*** | (2024.01) |
| ***G06T 5/77*** | (2024.01) |
| ***G06T 7/11*** | (2017.01) |
| ***G06T 7/194*** | (2017.01) |
| ***G06T 7/50*** | (2017.01) |
| ***H04N 23/60*** | (2023.01) |
| ***H04N 23/63*** | (2023.01) |

(52) U.S. Cl.
CPC ................ *G06T 7/11* (2017.01); *G06T 7/194* (2017.01); *G06T 7/50* (2017.01); *H04N 23/635* (2023.01); *H04N 23/64* (2023.01); *G06T 2200/24* (2013.01); *G06T 2207/20081* (2013.01); *G06T 2207/20212* (2013.01); *G06T 2207/30196* (2013.01)

(58) Field of Classification Search
CPC . G06T 7/194; G06T 7/50; G06T 11/60; G06T 2200/24; G06T 2207/20081; G06T 2207/20212; G06T 2207/30196
See application file for complete search history.

(56) References Cited

U.S. PATENT DOCUMENTS

| | | | | |
|---|---|---|---|---|
| 8,259,187 | B2 * | 9/2012 | Liu | H04N 23/698 348/222.1 |
| 9,153,004 | B2 * | 10/2015 | Hirano | H04N 23/633 |
| 9,665,764 | B2 * | 5/2017 | Baek | H04N 23/61 |
| 10,121,229 | B2 | 11/2018 | Gray | |
| 12,192,616 | B2 * | 1/2025 | Ma | H04N 23/667 |
| 2012/0120273 | A1 | 5/2012 | Amagai et al. | |
| 2014/0184841 | A1 | 7/2014 | Woo et al. | |
| 2015/0009359 | A1 | 1/2015 | Zaheer et al. | |
| 2016/0057363 | A1 | 2/2016 | Posa | |
| 2016/0148428 | A1 | 5/2016 | Agarwal et al. | |
| 2017/0024919 | A1 | 1/2017 | Murphy-Chutorian et al. | |
| 2019/0355172 | A1 * | 11/2019 | Dsouza | G06F 3/017 |
| 2021/0067676 | A1 | 3/2021 | Wen et al. | |
| 2024/0135572 | A1 | 4/2024 | Singh et al. | |

* cited by examiner

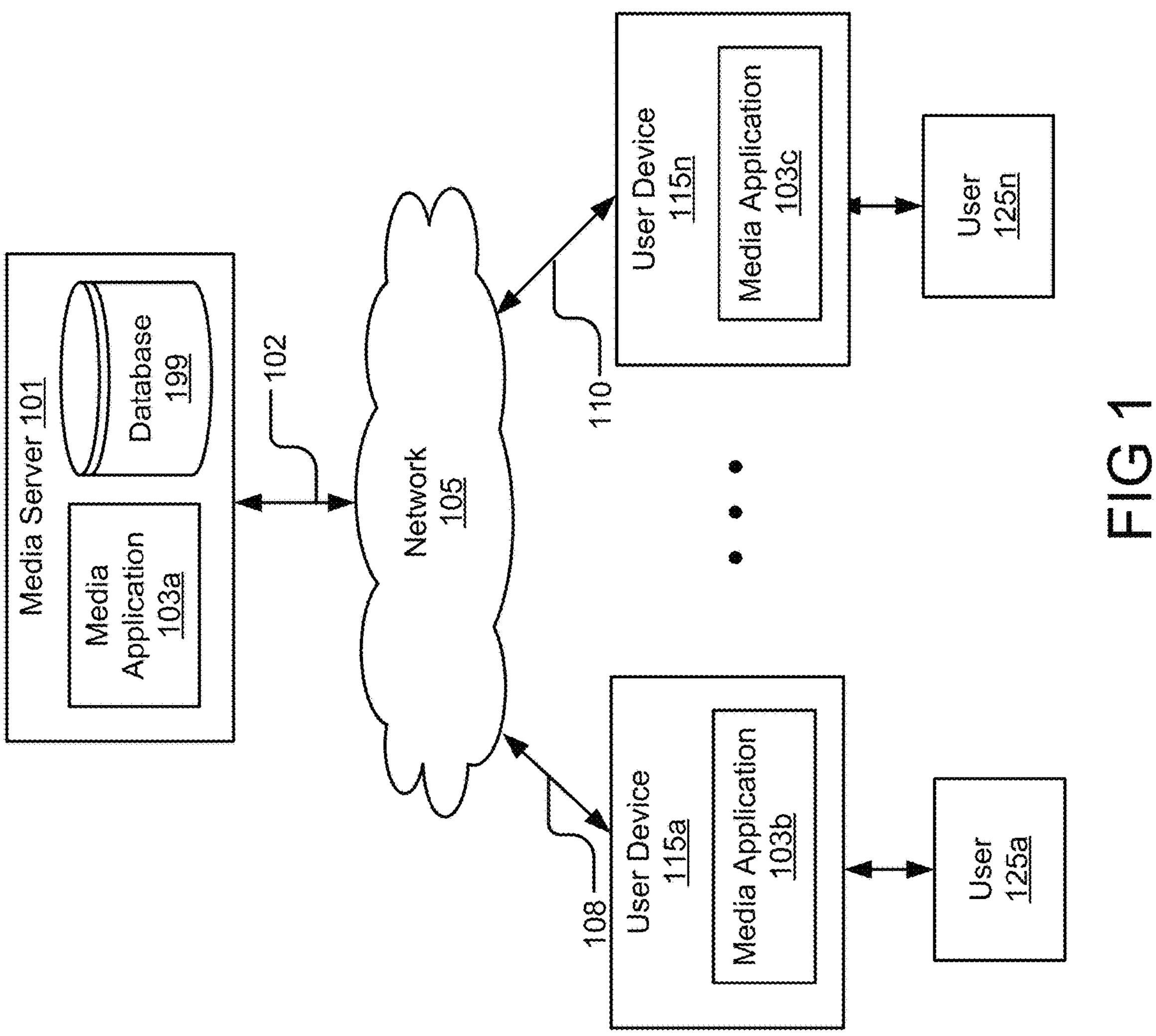
FIG 1

900

Receive a first image that includes one or more first subjects 902

Segment the one or more first subjects from the first image 904

Receive a second image that includes one or more second subjects 906

Responsive to at least one determination occurring, providing a suggestion to a user to generate a composite image, where the at least one determination is selected from the group of:
- a determination that the one or more first subjects are missing from the second image;
- a determination that a segmentation score generated by segmenting the one or more first subjects from the first image exceeds a threshold segmentation value;
- a determination that the second image includes space to fit the one or more first subjects;
- a determination that a stitching score associated with the second image exceeds a threshold segmentation value; and
- combinations thereof 908

Responsive to receiving a selection of the suggestion, generating the composite image that includes the one or more first subjects and the one or more second subjects 910

FIG 9

GENERATING A GROUP PHOTO THAT INCLUDES A PHOTOGRAPHER

BACKGROUND

People enjoy taking photographs featuring themselves and other individuals such as family, friends, co-workers, etc. A problem with photography is that the photographer is missing from the photos. Taking group photos currently requires positioning the camera (e.g., on a tripod or other support structure) and using a timer, camera remote control (e.g., infrared remote control, control by a paired devices such as a smartwatch, gesture-based control, etc.) to initiate the capture of a photo that features the photographer. However, support structures are often unavailable and many cameras do not support remote control. In such cases, the photographer is missing, and if the same person takes photos, that person is missing from the captured photos. For example, if a father in a family takes photos at an outdoor picnic, he is missing from the family photo album that features the captured photos.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes receiving, at a user device, a request to generate a composite image. The method further includes receiving a first image that includes one or more first subjects. The method further includes determining a previous pose of the user device associated with capture of the first image. The method further includes segmenting the one or more first subjects from the first image. The method further includes generating one or more overlays that correspond to the one or more first subjects based on segmenting the one or more first subjects. The method further includes displaying the one or more overlays on a viewfinder of the user device to provide guidance for a user to capture a second image based on a comparison of a current pose of the user device to the previous pose of the user device, wherein the second image includes one or more second subjects. The method further includes generating the composite image that includes the one or more first subjects and the one or more second subjects.

In some embodiments, the method further includes determining one or more first depths of the one or more first subjects in the first image, where the one or more overlays are displayed and the composite image is generated based on the one or more first depths. In some embodiments, the method further includes determining one or more second depths of the one or more second subjects in the second image and determining an order of the one or more first subjects and the one or more second subjects in the composite image based on one or more selected from a group of the one or more first depths, the one or more second depths, and an output from a machine-learning model, wherein the composite image includes the one or more first subjects in front of the one or more second subjects based on the order.

In some embodiments, the method further includes displaying a frame that changes responsive to the comparison of the current pose of the user device to the previous pose of the user device, where the frame is placed at a third depth based on the one or more first depths of the one or more first subjects in the first image and where the frame includes a width and a height that are in correspondence with the viewfinder. In some embodiments, the method further includes before generating the one or more overlays, segmenting a background and a foreground of the first image and determining that the one or more first subjects are in the foreground, wherein the one or more overlays and the composite image are generated based on the one or more first subjects being in the foreground. In some embodiments, the composite image is a first composite image that includes the one or more segmented first subjects added to the second image and the method further includes determining a first stitching score for the first composite image, segmenting the one or more second subjects from the second image, generating a second composite image by adding the one or more segmented second subjects to the first image, determining a second stitching score for the second composite image, and providing the first composite image to the user based on the first stitching score being greater than the second stitching score.

In some embodiments, segmenting the one or more first subjects from the first image further includes segmenting one or more objects attached to the one or more first subjects. In some embodiments, generating the composite image includes generating an intermediate image that combines the one or more segmented first subjects with the second image, identifying one or more objects that occlude the one or more first subjects or the one or more second subjects in the intermediate image, responsive to identifying the one or more objects that occlude, determining if one or more gaps are present in the intermediate image, and responsive to determining that one or more gaps are present, generating the composite image by inpainting the one or more gaps. In some embodiments, the method further includes guiding the user to capture the second image by tilting the user device as compared to the previous pose of the user device associated with capture of the first image. In some embodiments, prior to receiving the request to generate the composite image, the method further includes searching an image library associated with the user device to identify the second image with the one or more second subjects that are missing from the first image and responsive to identifying the second image with the one or more second subjects that are missing from the first image, generating a user interface that includes an option to request the composite image to be generated by combining the first image and the second image.

A system comprises one or more processors; and a memory that stores instructions that, when executed by the one or more processors cause the one or more processors to perform operations. The operations include receiving, at a user device, a request to generate a composite image; receiving a first image that includes one or more first subjects; determining a previous pose of the user device associated with capture of the first image; segmenting the one or more first subjects from the first image; generating one or more overlays that correspond to the one or more first subjects based on segmenting the one or more first subjects; displaying the one or more overlays on a viewfinder of the user device to provide guidance for a user to capture a second image based on a comparison of a current pose of the user device to the previous pose of the user device, wherein the second image includes one or more second subjects; and generating the composite image that includes the one or more first subjects and the one or more second subjects.

In some embodiments, the operations further include determining one or more first depths of the one or more first subjects in the first image, where the one or more overlays are displayed and the composite image is generated based on the one or more first depths. In some embodiments, the operations further include determining one or more second depths of the one or more second subjects in the second image and determining an order of the one or more first subjects and the one or more second subjects in the composite image based on one or more selected from a group of the one or more first depths, the one or more second depths, and an output from a machine-learning model, wherein the composite image includes the one or more first subjects in front of the one or more second subjects based on the order. In some embodiments, the operations further include displaying a frame that changes responsive to the comparison of the current pose of the user device to the previous pose of the user device, where the frame is placed at a third depth based on the one or more first depths of the one or more first subjects in the first image and the frame includes a width and a height that are in correspondence with the viewfinder A non-transitory computer-readable medium with instructions stored thereon that, when executed by one or more computers, cause the one or more computers to perform operations. The operations include receiving, at a user device, a request to generate a composite image; receiving a first image that includes one or more first subjects; determining a previous pose of the user device associated with capture of the first image; segmenting the one or more first subjects from the first image; generating one or more overlays that correspond to the one or more first subjects based on segmenting the one or more first subjects; displaying the one or more overlays on a viewfinder of the user device to provide guidance for a user to capture a second image based on a comparison of a current pose of the user device to the previous pose of the user device, wherein the second image includes one or more second subjects; and generating the composite image that includes the one or more first subjects and the one or more second subjects.

In some embodiments, the operations further include determining one or more first depths of the one or more first subjects in the first image, where the one or more overlays are displayed and the composite image is generated based on the one or more first depths. In some embodiments, the operations further include determining one or more second depths of the one or more second subjects in the second image and determining an order of the one or more first subjects and the one or more second subjects in the composite image based on one or more selected from a group of the one or more first depths, the one or more second depths, and an output from a machine-learning model, wherein the composite image includes the one or more first subjects in front of the one or more second subjects based on the order. In some embodiments, the operations further include displaying a frame that changes responsive to the comparison of the current pose of the user device to the previous pose of the user device, where the frame is placed at a third depth based on the one or more first depths of the one or more first subjects in the first image and the frame includes a width and a height that are in correspondence with the viewfinder. In some embodiments, the operations further include before generating the one or more overlays, segmenting a background and a foreground of the first image and determining that the one or more first subjects are in the foreground, wherein the one or more overlays and the composite image are generated based on the one or more first subjects being in the foreground.

BRIEF DESCRIPTION OF THE DRAWINGS

FIG. 1 is a block diagram of an example network environment, according to some embodiments described herein.

FIG. 9 illustrates a flowchart of another example method to generate a composite image, according to some embodiments described herein.

DETAILED DESCRIPTION

Figure 2:
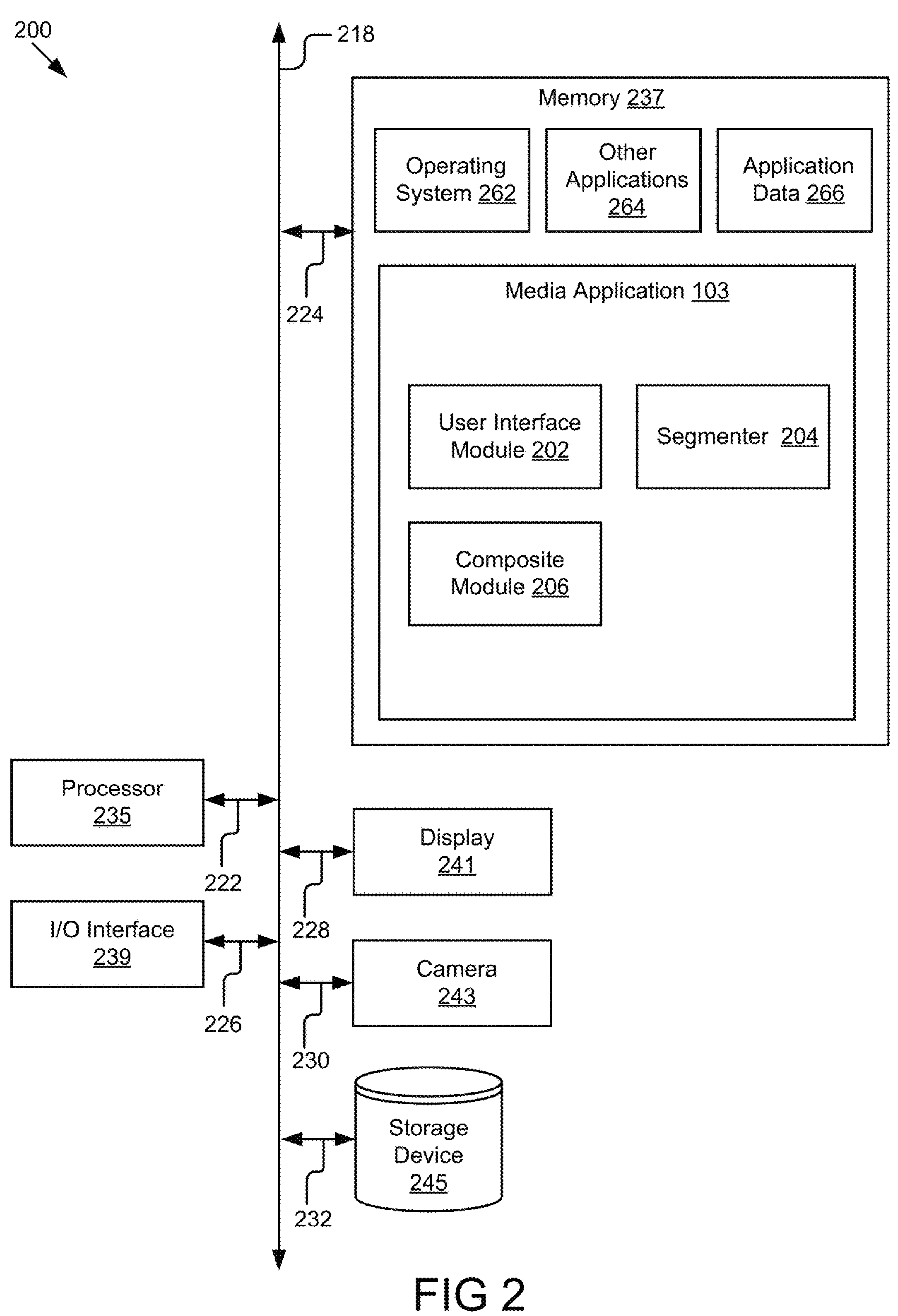
FIG. 2 is a block diagram of an example computing device, according to some embodiments described herein.

People enjoy taking photographs featuring themselves and other individuals such as family, friends, co-workers, etc. A problem with photography is that the photographer is missing from the photos. Taking group photos currently requires positioning the camera (e.g., on a tripod or other support structure) and using a timer, camera remote control (e.g., infrared remote control, control by a paired devices such as a smartwatch, gesture-based control, etc.) to initiate the capture of a photo that features the photographer. However, support structures are often unavailable and many cameras do not support remote control. In such cases, the photographer is missing, and if the same person takes photos, that person is missing from the captured photos. For example, if a father in a family takes photos at an outdoor picnic, he is missing from the family photo album that features the captured photos.

A media application solves these problems by presenting a user interface that guides a user to capture two different images: a first image with one or more first subjects and a second image with one or more second subjects including the photographer of the first image. The media application determines one or more depths of the one or more first subjects in the first image to generate one or more overlays in a viewfinder of the camera, e.g., an image preview displayed on a screen (e.g., in grayscale; with opacity; etc.). The image preview acts as guidance to the user to capture the second image and provide indications that the one or more second subjects will be positioned in three-dimensional locations and displayed in relation to the one or more first subjects. In some embodiments, the one or more overlays are semi-transparent to avoid a real-time calculation of the depth of the first and second subjects. In some embodiments, the one or more overlays are opaque and the media application illustrates the one or more first subjects as standing behind or in front of the one or more second subjects.

The media application uses the first image and the second image to generate a composite image that combines the one or more first subjects and the one or more second subjects. For example, one or more segmented first subjects may be combined with the second image or one or more segmented second subjects may be combined with the first image. In some embodiments, a first composite image associated with a first stitching score and a second composite image associated with a second stitching score are generated and the first composite image is presented to the user based on having a better stitching score than the second composite image.

Example Environment 100

FIG. 1 illustrates a block diagram of an example environment 100. In some embodiments, the environment 100 includes a media server 101, a user device 115*a*, and a user device 115*n* coupled to a network 105. Users 125*a*, 125*n* may be associated with respective user devices 115*a*, 115*n*. In some embodiments, the environment 100 may include other servers or devices not shown in FIG. 1. In FIG. 1 and the remaining figures, a letter after a reference number, e.g., "115*a*," represents a reference to the element having that particular reference number. A reference number in the text without a following letter, e.g., "115," represents a general reference to embodiments of the element bearing that reference number.

The media server 101 may include a processor, a memory, and network communication hardware. In some embodiments, the media server 101 is a hardware server. The media server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the media server 101 sends and receives data to and from one or more of the user devices 115*a*, 115*n* via the network 105. The media server 101 may include a media application 103*a* and a database 199.

The database 199 may store machine-learning models, training data sets, images, etc. The database 199 may also store social network data associated with users 125, user preferences for the users 125, etc.

The user device 115 may be a computing device that includes a memory coupled to a hardware processor. For example, the user device 115 may include a mobile device, a camera, a tablet computer, a mobile telephone, a wearable device, a head-mounted display, a mobile email device, a portable game player, or another electronic device capable of accessing a network 105.

In the illustrated implementation, user device 115*a* is coupled to the network 105 via signal line 108 and user device 115*n* is coupled to the network 105 via signal line 110. The media application 103 may be stored as media application 103*b* on the user device 115*a* and/or media application 103*c* on the user device 115*n*. Signal lines 108 and 110 may be wired connections, such as Ethernet, coaxial cable, fiber-optic cable, etc., or wireless connections, such as Wi-Fi®, Bluetooth®, or other wireless technology. User devices 115*a*, 115*n* are accessed by users 125*a*, 125*n*, respectively. The user devices 115*a*, 115*n* in FIG. 1 are used by way of example. While FIG. 1 illustrates two user devices, 115*a* and 115*n*, the disclosure applies to a system architecture having one or more user devices 115.

The media application 103 may be stored on the media server 101 or the user device 115. In some embodiments, the operations described herein are performed on the media server 101 or the user device 115. In some embodiments, some operations may be performed on the media server 101 and some may be performed on the user device 115. Performance of operations are in accordance with user settings. For example, the user 125*a* may specify settings that operations are to be performed on their respective user device 115*a* and not on the media server 101. With such settings, operations described herein are performed entirely on user device 115*a* and no operations are performed on the media server 101. Further, a user 125*a* may specify that images and/or other data of the user are to be stored only locally on a user device 115*a* and not on the media server 101. With such settings, no user data is transmitted to or stored on the media server 101. Transmission of user data to the media server 101, any temporary or permanent storage of such data by the media server 101, and performance of operations on such data by the media server 101 are performed only if the user has agreed to transmission, storage, and performance of operations by the media server 101. Users are provided with options to change the settings at any time, e.g., such that they can enable or disable the use of the media server 101.

Machine learning models (e.g., neural networks or other types of models), if utilized for one or more operations, are stored and utilized locally on a user device 115, with specific user permission. Server-side models are used only if permitted by the user. Further, a trained model may be provided for use on a user device 115. During such use, if permitted by the user 125, on-device training of the model may be performed. Updated model parameters may be transmitted to the media server 101 if permitted by the user 125, e.g., to enable federated learning. Model parameters do not include any user data.

The media application 103*b* receives a request to combine multiple images. The media application 103*b* receives a first image that includes one or more first subjects. The media application 103 determines a previous pose of the user device when the first image was captured. The media application 103 segments the one or more first subjects from the first image. The media application 103*b* generates one or more overlays based on segmenting the one or more first subjects and comparing a current pose of the user device to the previous pose of the user device. The media application 103*b* displays the one or more overlays on a viewfinder of the user device 115*a* to provide guidance for a user to capture a second image that is aligned with the first image. The media application 103 generates a composite image that includes the one or more first subjects and the one or more second subjects.

In some embodiments, the media application 103 may be implemented using hardware including a central processing unit (CPU), a field-programmable gate array (FPGA), an application-specific integrated circuit (ASIC), machine learning processor/co-processor, any other type of processor, or a combination thereof. In some embodiments, the media application 103*a* may be implemented using a combination of hardware and software.

Example Computing Device 200

FIG. 2 is a block diagram of an example computing device 200 that may be used to implement one or more features described herein. Computing device 200 can be any suitable computer system, server, or other electronic or hardware device. In one example, computing device 200 is media server 101 used to implement the media application 103*a*. In another example, computing device 200 is a user device 115*a* used to implement the media application 103*b*.

In some embodiments, computing device 200 includes a processor 235, a memory 237, an input/output (I/O) interface 239, a display 241, a camera 243, and a storage device 245 all coupled via a bus 218. The processor 235 may be coupled to the bus 218 via signal line 222, the memory 237 may be coupled to the bus 218 via signal line 224, the I/O interface 239 may be coupled to the bus 218 via signal line 226, the display 241 may be coupled to the bus 218 via signal line 228, the camera 243 may be coupled to the bus 218 via signal line 230, and the storage device 245 may be coupled to the bus 218 via signal line 232.

Processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 235 may include one or more co-processors that implement neural-network processing. In some embodiments, processor 235 may be a processor that processes data to produce probabilistic output, e.g., the output produced by processor 235 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 237 is typically provided in computing device 200 for access by the processor 235 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including a media application 103.

The memory 237 may include an operating system 262, other applications 264, and application data 266. Other applications 264 can include, e.g., an image library application, an image management application, an image gallery application, communication applications, web hosting engines or applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

The application data 266 may be data generated by the other applications 264 or hardware of the computing device 200. For example, the application data 266 may include images used by the image library application and user actions identified by the other applications 264 (e.g., a social networking application), etc.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 245), and input/output devices can communicate via I/O interface 239. In some embodiments, the I/O interface 239 can connect to interface devices such as input devices (keyboard, pointing device, touchscreen, microphone, scanner, sensors, etc.) and/or output devices (display devices, speaker devices, monitors, etc.).

Some examples of interfaced devices that can connect to I/O interface 239 can include a display 241 that can be used to display content, e.g., images, video, and/or a user interface of an output application as described herein, and to receive touch (or gesture) input from a user. For example, display 241 may be utilized to display a user interface that includes an overlay that serves as a graphical guide on a viewfinder. Display 241 can include any suitable display device such as a liquid crystal display (LCD), light emitting diode (LED), or plasma display screen, cathode ray tube (CRT), television, monitor, touchscreen, three-dimensional display screen, or other visual display device. For example, display 241 can be a flat display screen provided on a mobile device, multiple display screens embedded in a glasses form factor or headset device, or a monitor screen for a computer device.

Camera 243 may be any type of image capture device that can capture images and/or video. In some embodiments, the camera 243 captures images or video that the I/O interface 239 transmits to the media application 103.

The storage device 245 stores data related to the media application 103. For example, the storage device 245 may store a training data set that includes labeled images, a machine-learning model, output from the machine-learning model, etc.

FIG. 2 illustrates an example media application 103, stored in memory 237, that includes a user interface module 202, a segmenter 204, and a composite module 206.

The user interface module 202 generates graphical data for displaying a user interface that includes images. The images may be received from the camera 243 of the computing device 200 and/or from the media server 101 via the I/O interface 239.

The user interface module 202 obtains permission from a user to modify any images. A user may be provided with controls allowing the user to make an election as to both if and when systems, programs, or features described herein may enable collection or use of user information (e.g., identification of the user in an image, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In some embodiments, the user interface module 202 receives a request to generate a group photo. The user interface may include a button with an option to generate a composite image, a suggestion to add the photographer, etc. In some embodiments, the option to generate the composite image is displayed after a first image is captured or after opening the media application 103.

Figure 3C:
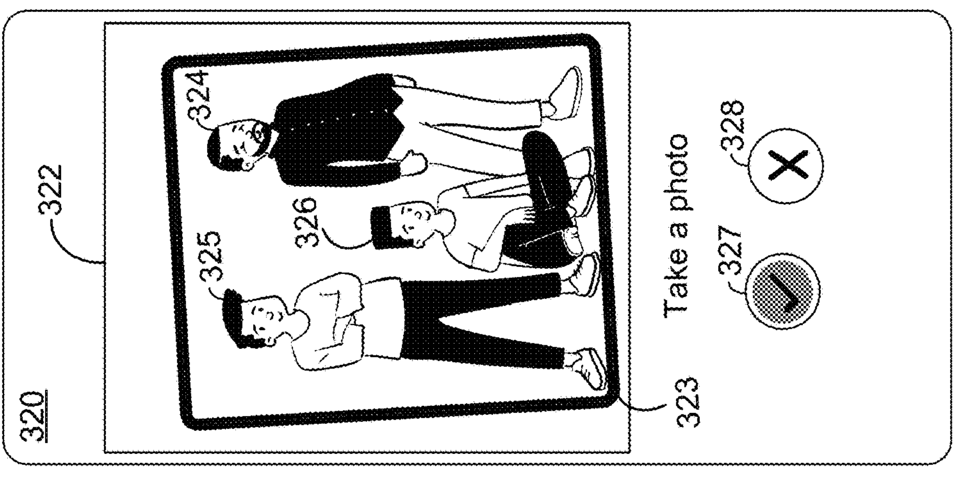
FIG. 3C is an example user interface that includes a viewfinder with a frame, a first overlay, and a second overlay to guide a user to capture a second image, according to some embodiments described herein.
Figure 3B:
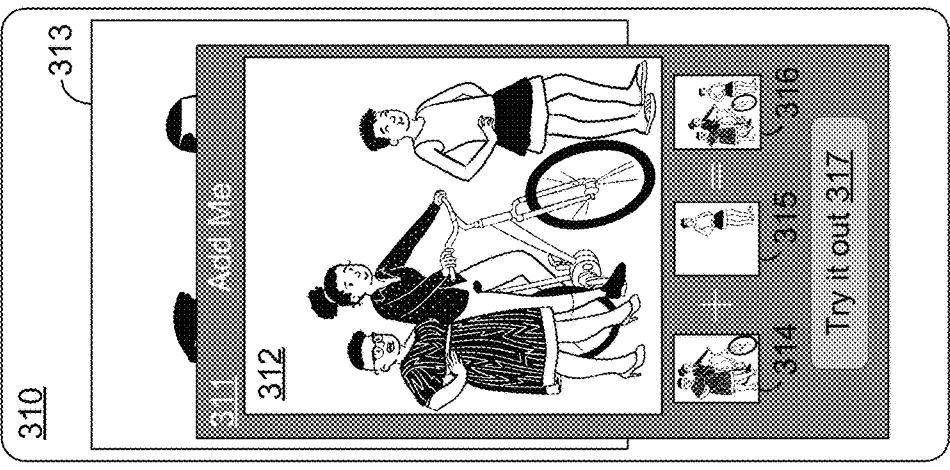
FIG. 3B is an example user interface of a preview of the group photo, according to some embodiments described herein.
Figure 3A:
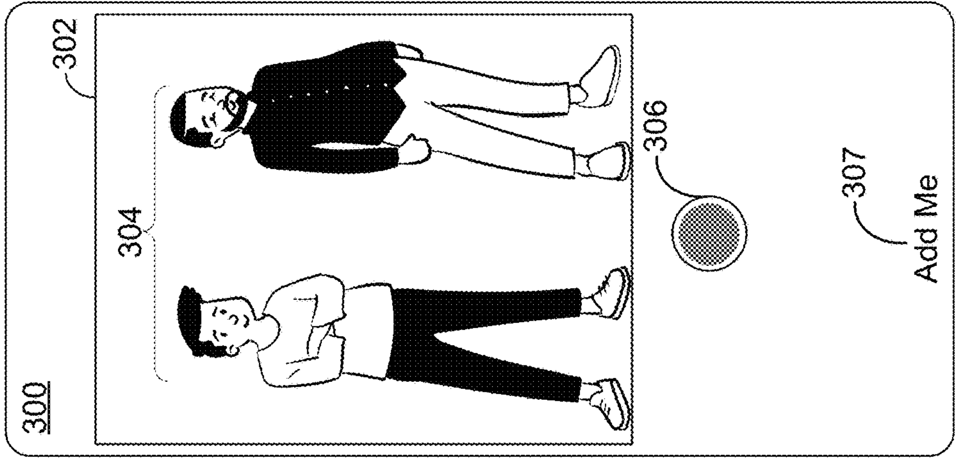
FIG. 3A is an example user interface with an option to generate a group photo that includes a photographer, according to some embodiments described herein.

Turning to FIG. 3A, an example user interface 300 is illustrated with an option to generate a group photo that includes a photographer, according to some embodiments described herein. In this example, two first subjects 304 are displayed within the viewfinder 302. A user may capture an additional image by selecting the capture button 306 or change the capture mode by selecting the "Add Me" clickable text 307. In some embodiments, instead of "Add Me" on the user interface 300, the user interface includes other text, such as "Want to be in the group photo?"

In this example, the user selects the "Add Me" clickable text 307 and captures a first image by selecting the capture button 306. The user interface module 202 may perform object recognition to identify a person and a face of each subject in the first image.

FIG. 3B is an example user interface 310 of a preview of a group image, according to some embodiments described herein. The user interface module 202 displays a preview 311 of a group image 312 to illustrate to a user how the "Add Me" feature works. The preview 311 also includes a first image icon 314, a second image icon 315, and a group image icon 316 to illustrate how the different images are combined to form the group image 312. A user may select the "Try it out" button 317 to start a process for generating a group photo from the first image captured in FIG. 3A.

In some embodiments, the user interface 310 in FIG. 3B is part of a video with text or audio that explains that the video demonstrates how to use the "Add Me" feature. In the video, two people are posing and a photo is taken. The two people leave the area while another person enters next to where the two people once were. Another photo is taken. The final group photo is as if all three people were posing at the same time. The user interface may also include suggestions, such as capturing images where the person being added is fully visible without making direct contact with the group or scene, capturing a first image that has enough room for the photographer to be added to the group photo, capturing images that avoid black walls and surfaces, capturing images with less than a threshold number of people (e.g., 20 people), and explanations for how the guidance works.

The segmenter 204 receives the first image and the identified people and faces of subjects in the first image from the user interface module 202. The segmenter 204 segments each of the first subjects 304 from the first image to identify pixels associated with each of the first subjects 304. In some embodiments, the one or more segmented subjects include corresponding shadows. In some embodiments, the segmenter 204 identifies the one or more subjects in the foreground.

In some embodiments, the user interface module 202 receives the one or more segmented subjects from the segmenter 204. For example, the user interface module 202 may receive a segmentation map that identifies pixels associated with each of the one or more subjects and pixels that are not associated with each of the one or more subjects. In another example, the user interface module 202 may receive an identification of the one or more subjects in the foreground.

The user interface module 202 uses the one or more segmented subjects to generate one or more overlays that correspond to the one or more first subjects. For example, one subject may be represented by one overlay, two subjects may be represented by two overlays, etc. The one or more first subjects may be displayed as the pixels associated with the one or more first subjects or an outline of the pixels associated with the one or more first subjects. In some embodiments, the one or more overlays are based on the one or more subjects identified as being in the foreground.

In some embodiments, the user interface module 202 identifies people that are currently in the viewfinder and generates one or more overlays for subjects that are unique between the first image and the people that are currently in the viewfinder. For example, if the first image includes subjects A, B, and C, and the viewfinder currently includes subjects C and D, the user interface module 202 may generate an overlay for subject A and an overlay for subject B, but not an overlay for subject C since subject C will be present in the second image.

The user interface module 202 identifies feature points in a background of the first image. The feature points may be coordinates associated with visually distinct features in the first image, such as coordinates derived from the edges and corners of objects in the first image. Clusters of feature points that appear to lie on common horizontal or vertical surfaces, like tables or walls, make the surfaces into geometric planes. The user interface module 202 uses the feature points to compute a change in pose (i.e., the position and orientation of the user device 115) from a previous pose to a current pose based on a simultaneous localization and mapping process. The user interface module 202 obtains information about the user device 115, such as its angular velocity and accelerations, from the Inertial Measurement Unit (IMU). The user interface module 202 combines the feature points with information from the IMU to estimate the current pose of the user device 115 relative to the world over time.

The user interface module 202 determines one or more depths of the one or more first subjects in the first image. The one or more depths may be based on a depth map generated by the user interface module 202 using the feature points. For example, for each of the first subjects in the first image, the user interface module 202 determines a depth of a first subject using a distance between the eyes of the first subject in the first image.

The user interface module 202 uses the one or more depths of the one or more first subjects to determine the position, scale, and transformation for each of the one or more first subjects from the first image to one or more overlays. For example, one first subject may be positioned in the overlay as being in front of another first subject and, as a result, is scaled to be a larger size. The one or more overlays are displayed on a viewfinder of the computing device 200 to provide guidance for a user to capture a second image. For example, the one or more overlays are used to guide the one or more second subjects to be positioned at a corresponding depth so that the one or more second subjects are aligned with the one or more first subjects. The user interface module 202 renders the one or more overlays as if the one or more first subjects are physical objects in a three-dimensional world and updates the one or more overlays as the user device 115 moves in three-dimensional space.

In some embodiments, the user interface includes a frame with a width and height that are in correspondence with the viewfinder. The frame is placed at a depth that corresponds to the depths of one or more first subjects. For example, the frame may be placed at a depth that is in between a first depth of a first subject and a second depth of a first subject. The frame changes responsive to a current pose of the user device 115 changing as compared to a previous pose of the user device 115 when the first image was captured. For example, the frame increases in size as the user device 115 gets closer to the previous pose of the user device 115.

The user interface module 202 uses the frame to guide the user to capture the second image with the user device 115 in a similar pose as the first image was captured to avoid parallax and thereby reduce or avoid altogether a number of gaps in the pixels that are filled in with pixels during inpainting of composite image. Capturing the second image with the user device 115 in a similar pose as compared to the first image also advantageously improves the quality of the composite image based on reducing errors in depth and geometry calculations.

FIG. 3C is an example user interface 320 with a viewfinder 322 that includes a frame 323, a first overlay 324 of a first subject, a second overlay 325 of a first subject, and a second subject 326 on a viewfinder 322 to guide a user to capture a second image of the second subject 326 that is aligned with the first overlay 324 and the second overlay 325, according to some embodiments described herein. In this example, the first image and the second image are captured consecutively.

In some embodiments, the first overlay 324 and the second overlay 325 are partially transparent. Transparent overlays 324, 325 are helpful if the first subjects do not move out of the viewfinder 322 because the user may align the overlays 324, 325 of the first subjects with the actual first subjects. In some embodiments, the overlays 324, 325 change color or provide a type of indication when the current pose of the user device 115 is aligned with the previous pose of the user device 115 when the first image was captured.

The user interface module 202 updates the frame 323, the first overlay 324, and the second overlay 325 in the viewfinder 322 to reflect the change of the user device 115 in three-dimensional space. In FIG. 3C, the user device 115 is angled, which makes the frame 323, the first overlay 324, and the second overlay 325 aligned with the background. The frame 323 updates responsive to the user device 115 moving in all three dimensions in space to guide the user to position the user device 115 based on three-dimensional rotations and three-dimensional translations. For example, the frame 323 may update to suggest to the user to tilt the user device 115 in different directions. The user may select the capture button 327 to capture a second image or the cancel button 328 to exit out of a group photo capture mode.

Figure 3F:
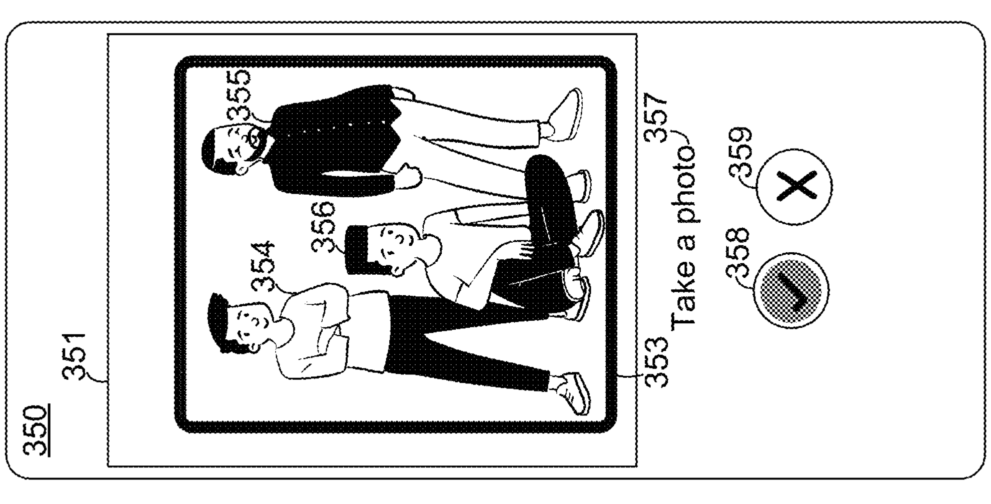
FIG. 3F is an example user interface of a frame and overlays that guide a user to capture the image, according to some embodiments described herein.
Figure 3E:
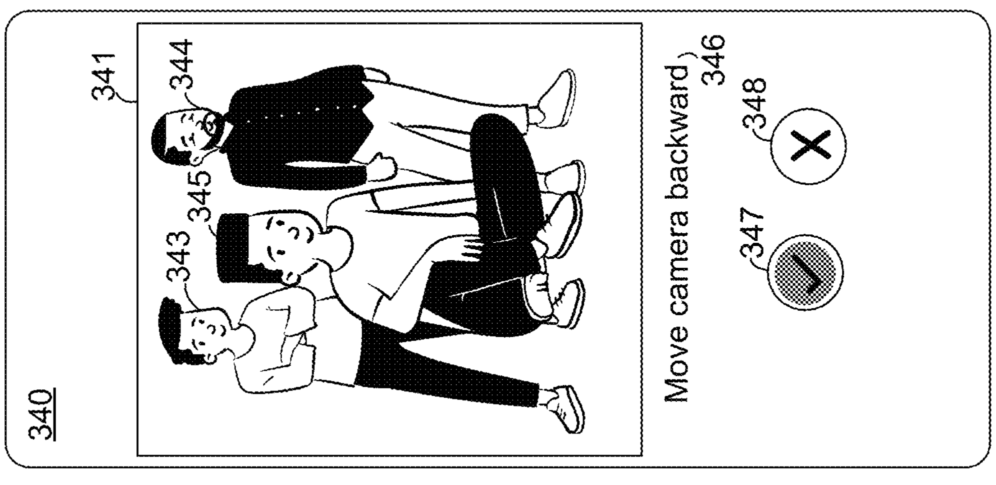
FIG. 3E is an example user interface that alerts a user that the user device is too close to the second subject, according to some embodiments described herein.
Figure 3D:
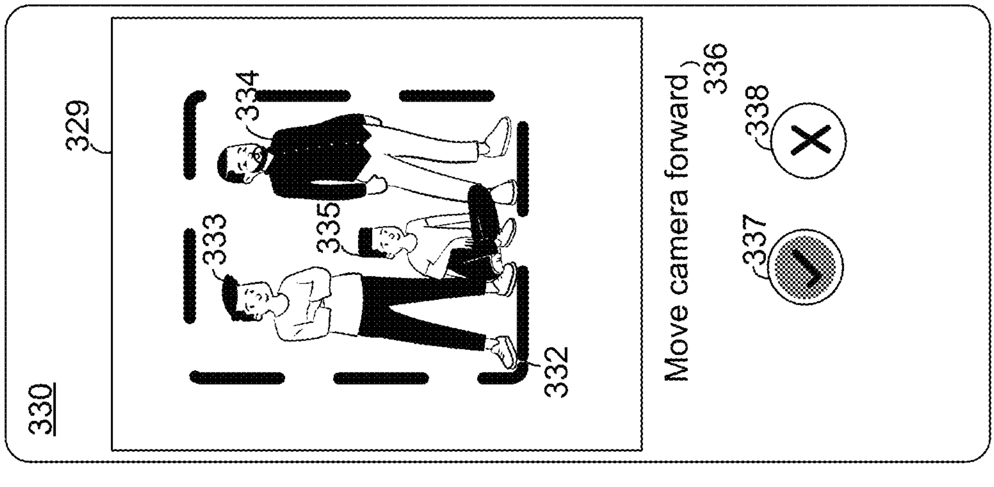
FIG. 3D is an example user interface that alerts a user that the user device is too far away from where the first image was captured, according to some embodiments described herein.

FIG. 3D is an example user interface 330 that alerts a user that the user device 115 is too far away from where the first image was captured, according to some embodiments described herein. The user interface 330 includes a viewfinder 329 with a frame 332, a first overlay 333 of a first subject, a second overlay 334 of a second subject, and a second subject 335.

The frame 332 is illustrated with dashed lines to show that the frame 332 has a different appearance from the other frame displayed by the user interface module 202. The frame 332 may be illustrated in a different color (e.g., black or green for an acceptable difference, and red when a user device 115 is too far away from the capture position and angle of the first image. The user interface 330 also includes text 336 (e.g., "Move camera forward" or "Move forward to align with the frame") to signal to the user that the user device 115 is too far away from the second subject 335. In some embodiments, the user device 115 also provides haptic feedback, such as a buzzing to signal to the user that the user device 115 is too far from where the first image was captured. As the user device 115 is moved closer to the second subject 335, the frame 332 may revert back to the acceptable color and/or the user device 115 may stop providing haptic feedback. In some embodiments, instead of displaying a frame, the user interface module 202 displays a different type of indicator, such as feet and/or arrows to guide a user on where to move to align the current pose of the user device 115 with the previous pose of the user device 115.

The user may select the capture button 337 to capture a second image or the cancel button 338 to exit out of a group photo capture mode.

FIG. 3E is an example user interface 340 that alerts a user that the user device 115 is too close to the second subject 345, according to some embodiments described herein. In this example, the viewfinder 341 includes a first overlay 343 of a first subject, a second overlay 344 of a second subject, and a second subject 345. In some embodiments, the user interface module 202 determines that the current pose of the user device 115 is outside the acceptable range and, as a result, the user interface module 202 updates user interface to remove the frame. In some embodiments, the user device 115 also provides haptic feedback to signal to the user that the user device 115 is too close.

The difference in size between the first overlay 343 and the second overlay 344, and the second subject 345 also indicates that the current pose of the user device 115 is not aligned with the previous pose of the user device 115 where the first image was captured. The user interface 330 includes text 346 (e.g., "Move camera backward" or "Too close. Move back.") alerting the user that the user device 115 is too close.

The user may select the capture button 347 to capture a second image or the cancel button 348 to exit out of a group photo capture mode.

The user interface module 202 may display additional instructions for moving the user device 115. For example, the user interface may include instructions for moving the user device 115 left, right, up, down, rotating the user device 115 to capture images in a portrait orientation and not a landscape orientation, or panning the user device 115 to scan an area. In some embodiments, the user interface includes a graphic to show where a user capturing the second image should stand so that the second image can be aligned with the first image. In some embodiments, the user interface includes real-time guidance that suggests that images be captured in a brighter area if a user is capturing images in an area without enough light exposure.

FIG. 3F is an example user interface 350 of a viewfinder 351 with a frame 353, a first overlay 354 of a first subject, and a second overlay 355 of a first subject that guide a user to capture a second image of the second subject 356, according to some embodiments described herein. In this example, the second subject 356 is positioned as being in front of the first overlay 354 and the second overlay 355 based on the depth of the first subjects in the first image and the second subject 356. Other variations are possible, such as an overlay where the first overlay 354 and the second overlay 355 are semi transparent and the position of the first overlay 354, the second overlay 355, or the second subject 356 as being in front may not be discernible.

The current pose of the user device 115 and the previous pose of the user device 115 are aligned and, as a result, the user interface 350 includes text 357 (i.e., "Take a photo") suggesting that the user capture a second image. The user may select the capture button 358 to capture a second image or the cancel button 359 to exit out of a group photo capture mode.

Figure 3H:
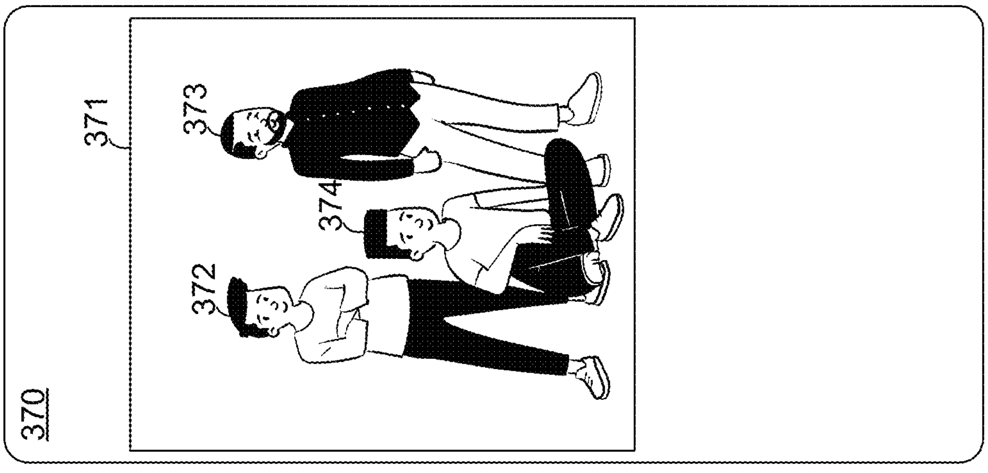
FIG. 3H is an example of the group image, according to some embodiments described herein.
Figure 3G:
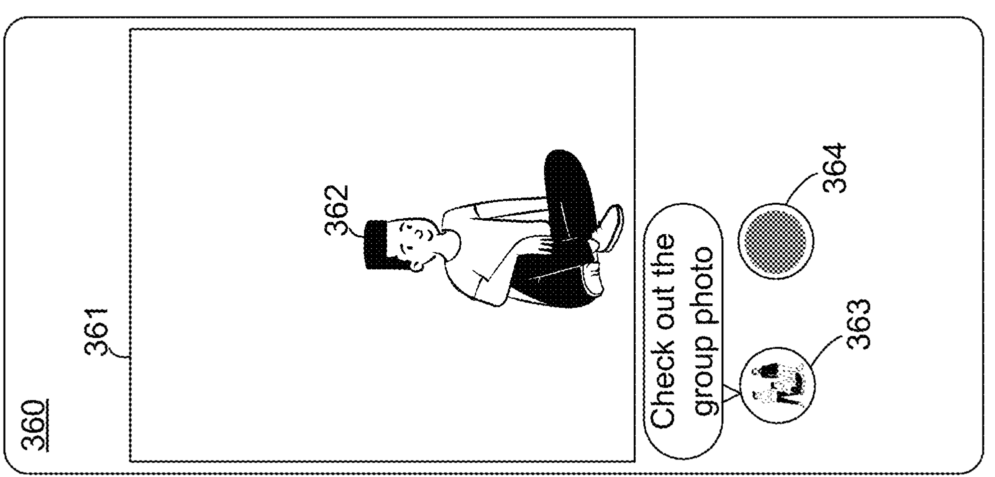
FIG. 3G is an example user interface that includes an option to view the group image, according to some embodiments described herein.

FIG. 3G is an example user interface 360 that includes an option to view the group image, according to some embodiments described herein. The user interface 360 includes the second image 361 with the second subject 362. The user interface 360 also includes an option to view a group image 363 or to capture another image by pressing the capture button 364. In this example, the user selects the option to view the group image 363.

Once the second image 361 is captured, the composite module 206 generates a composite image. FIG. 3H is an example user interface 370 that includes the group image 371, according to some embodiments described herein. The group image 371 is a composite image that is generated from the first image and the second image. The group image 371 includes the first subjects 372, 373 and the second subject 374. In some embodiments, the user interface module 202 may provide functionality for a user to adjust the second subject 364 by moving the second subject 364, scaling the second subject 364, change a depth ordering of the second subject 364, etc.

The user interface module 202 may generate different user interfaces for generating a composite image for different processes or a variation of the same process as illustrated in FIGS. 3A-3H. In some embodiments where generating a group image fails, the user interface module 202 generates a user interface that notifies the user of a failure to generate the group image. In some embodiments, instead of capturing consecutive images for a composite image, the user interface module 202 generates a user interface with an option to select a first subject (or a second subject) from a plurality of options to combine with an image of a second subject to generate a composite image. The plurality of options may be segmented by the segmenter 204 from a series of images taken during the same event (e.g., at the same location, within a short time period, etc.), from different events during the same day, or from different events on different days.

Figure 4:
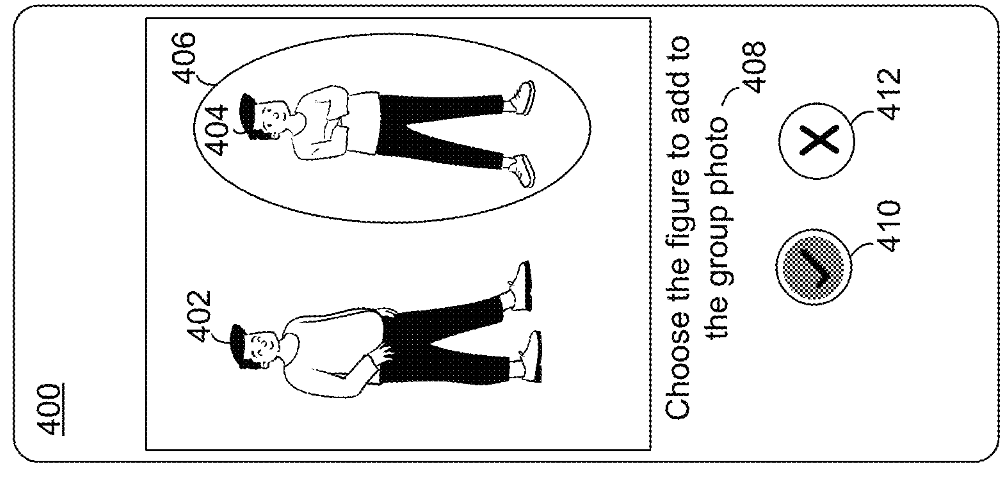
FIG. 4 is an example user interface that includes an option to select a version of a subject to add to a group image, according to some embodiments described herein.

FIG. 4 is an example user interface 400 that includes an option to select a version of a subject to add to a group image, according to some embodiments described herein. The segmenter 204 segments a subject from two different images. The user interface module 202 generates a user interface 400 that includes the two segmented subjects 402, 404. A user has selected the second of the segmented subjects 404 to be included in a group photo, as indicated by the circle 406 around the second of the segmented subjects 404. The user interface 400 includes text 408 (e.g., "Choose the figure to add to the group photo") to guide the user to choose one of the segmented subjects 402, 404.

The user may accept the selection by selecting the check-box icon 410 or reject the option by selecting the X icon 412.

In some embodiments, instead of selecting one of the two segmented subjects 402, 404 to be added to a group photo, the user interface module 202 generates a user interface with a drag and drop option for dragging one of the segmented subjects into an image with a second subject and dropping the selected segmented subject in a preferred location. The composite module 206 may generate a composite image based on the user input.

In some embodiments, the user interface module 202 generates a user interface that shows an outline of a segmented subject to guide the user to stand in a certain location for a subsequent image.

Figure 5C:
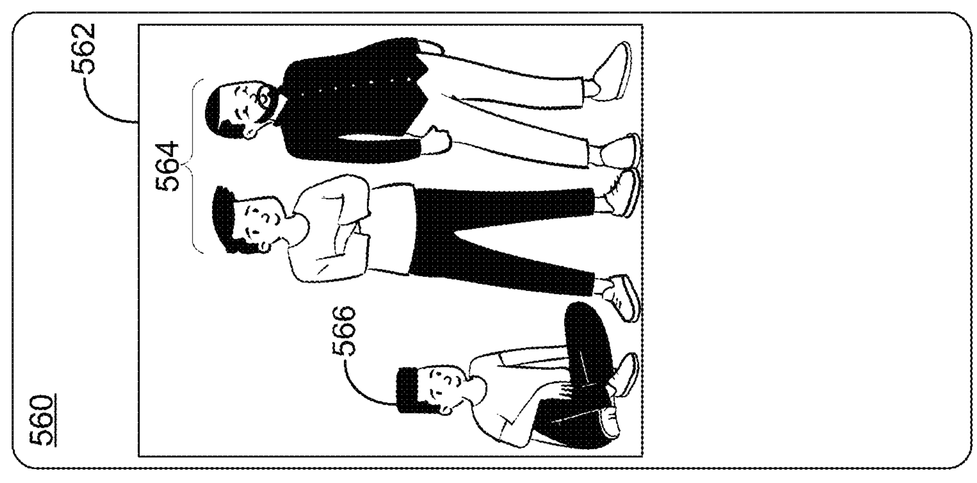
FIG. 5C is an example user interface that includes the composite image of the first subjects and the second subject, according to some embodiments described herein.
Figure 5B:
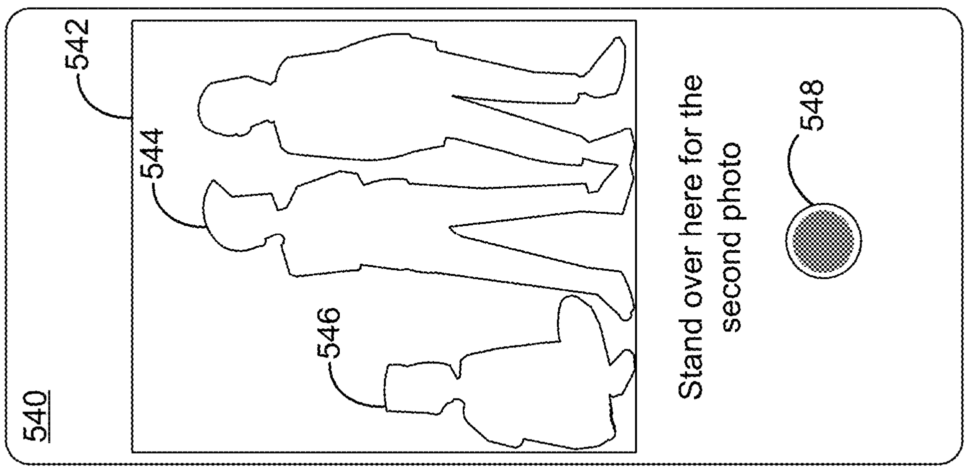
FIG. 5B is an example user interface of a viewfinder with outlines to guide a user of where to stand, according to some embodiments described herein.
Figure 5A:
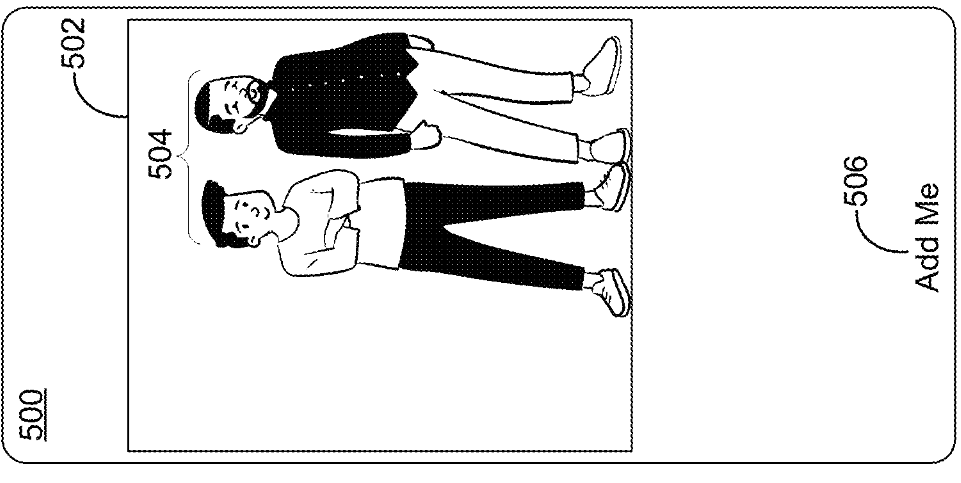
FIG. 5A is another example user interface with an option to generate a group photo that includes a photographer, according to some embodiments described herein.

FIG. 5A is another example user interface 500 with an option to generate a group photo that includes a photographer, according to some embodiments described herein. In this example, the first image 502 includes two first subjects 504. A user may select the "Add Me" clickable text 506 to initiate a composite mode.

The segmenter 204 segments the first subjects 504 from the first image 502.

FIG. 5B is an example user interface 540 with a viewfinder 542 that includes outlines 544, 546 to guide a user of where to stand, according to some embodiments described herein. In this example, the viewfinder 542 includes an outline 544 for the segmented first subjects and an outline 546 for a segmented second subject. In some embodiments, instead of using an outline 546 that is particular to the second subject, the user interface module 202 may use a generic outline that represents the second subject. For example, the generic outline could be a rectangle that represents the dimensions of a person. The outline 546 for the second subject is used to direct a second subject on where to stand. Once the second subject is aligned with the outline 546 for the second subject, the user may select the capture button 548. In some embodiments, one or more of the outlines 544, 546 are transparent so that a photographer can see how the second subject can be positioned to be aligned with the outline 544.

Once the user selects the capture button 548, the composite module 206 generates a composite image. FIG. 5C is an example user interface 560 that includes the composite image 562 of the first subjects 564 and the second subject 566, according to some embodiments described herein.

In some embodiments, the user interface module 202 generates a suggestion to add a subject to an image. For example, a user interface module 202 may identify that multiple images were taken in a same location with different subjects and suggest providing a group photo that includes all the subjects in the same group photo. In some embodiments, the user interface module 202 suggests adding a second subject to an image of one or more first subjects responsive to determining that there is sufficient room in the image (e.g., a distance between first subjects exceeds a threshold distance value) to add the second subject. In some embodiments, the user interface module 202 suggests adding a second subject to an image of one or more first subjects responsive to determining that the images have subjects that can be segmented (e.g., based on a segmentation score that exceeds a threshold segmentation value). In some embodiments, the user interface module 202 suggests adding a second subject to an image of one or more first subjects responsive to receiving a stitching score from the composite module 206 that exceeds a threshold stitching score where the stitching score reflects an ability to combine images.

Figure 6:
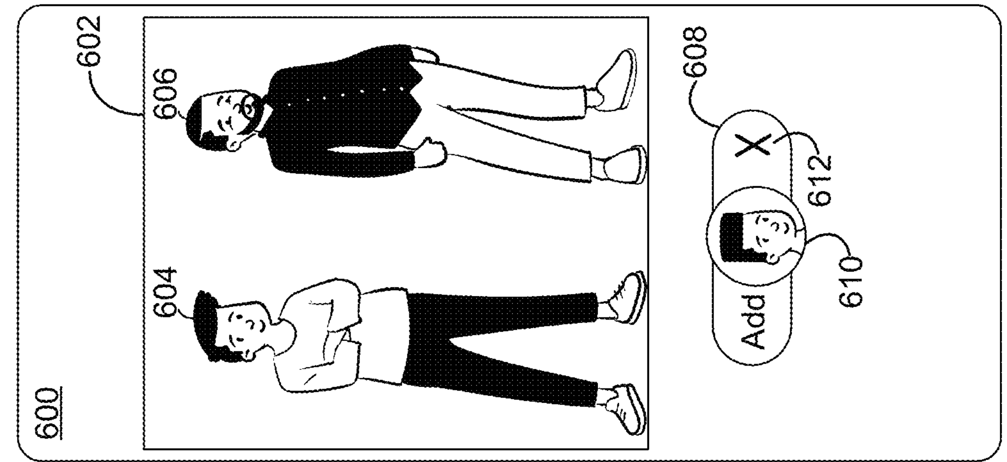
FIG. 6 is an example user interface of an image of first subjects that includes an option to add a second subject to the image, according to some embodiments described herein.

FIG. 6 is an example user interface 600 of an image 602 of first subjects 604, 606 that includes an option 608 to add a second subject to the image 602, according to some embodiments described herein. The user interface module 202 may provide the user interface 600 for reasons, such as the ones discussed above. For example, the user interface module 202 may determine that there is sufficient room to add a second subject to the image 602 and provides option 608 to add the second subject responsive to the determination. The option includes a portion 610 of the second subject from a different image. The option 608 also includes an "X" 612 that a user may select to remove the option 608 from the user interface 600.

In some embodiments, the user interface module 202 generates a user interface that instructs a user to capture a second image from a different vertical and/or horizontal field of view as compared to the previous pose of the user device 115 during capture of the first image. The composite module 206 uses the different fields of view from the first image and the second image to obtain more pixels associated with a subject to avoid a composite image where portions of a subject are missing.

Figure 7:
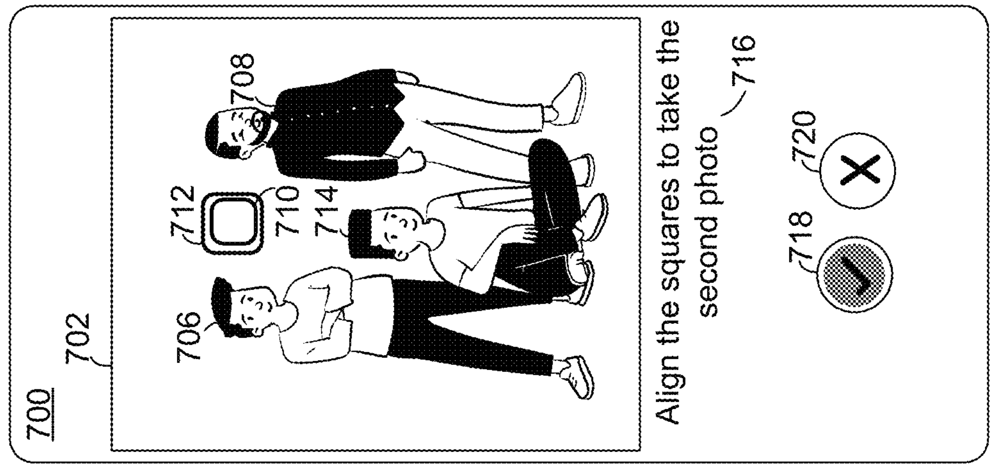
FIG. 7 is an example user interface of a viewfinder that includes two indicators that guide a user to rotate and translate a user device to align the two indicators, according to some embodiments described herein.

FIG. 7 is an example user interface 700 of a viewfinder 702 that includes two indicators 710, 712 that guide a user to rotate and translate a user device 115 to align the two indicators 710, 712, according to some embodiments described herein. As a user rotates and/or translates the user device 115, the first indicator 710 stays in a fixed position along with the second subject 714 while the second indicator 712 moves along with the first overlay 706 of the first subject and the second overlay 708 of the second subject. The user rotates and/or translates the user device 115 until the second indicator 712 is located within the first indicator 710. In some embodiments, one or more of the indicators 710, 712 changes color to indicate that the user device 115 is properly aligned. The user interface 700 also includes text 716 (e.g., "Align the squares to take the second photo") to guide the user to rotate the user device 115. Once the indicators 710, 712 are aligned, the user may select the checkmark button 718 to capture a second image or select the X button 720 to reject the composite mode.

The segmenter 204 segments one or more subjects in an input image (e.g., a first image, a second image, etc.) from the input image. In some embodiments, the segmenter 204 generates a segmentation map that identifies pixels that are associated with the one or more subjects in the input image. For example, the segmentation map may include an identification of subject pixels associated with the one or more subjects and remaining pixels that are associated with the rest of the input image.

In some embodiments, the segmenter 204 segments objects that are attached to subjects. For example, a subject may be sitting in a chair, standing on a scooter, holding a bag, etc. The segmenter 204 may segment the objects that are attached to subjects to create a composite image that includes the objects. Otherwise, the subjects may be incomplete because objects may obscure part of the subjects. For example, without segmenting the objects attached to the subjects, a subject may be missing part of his legs if he's in front of a table, part of her hand if she's holding a bag, etc.

In some embodiments, the segmenter 204 filters the background to remove background subjects. The segmenter 204 may perform segmentation by determining a foreground and background in the input image. In some embodiments, the segmenter 204 uses an alpha map as part of a technique for distinguishing the foreground and background of the input image during segmentation.

In some embodiments, the segmenter 204 performs image matting by reclassifying the segmentation map by refining the classification of each pixel as well as an alpha value associated with each pixel, where the alpha value corresponds to the percentage distribution between subject and background in the corresponding pixel. Pixels may have a more mixed distribution of foreground and background percentages when the pixels are located along the boundaries of objects. Image matting may be advantageously used for portions of a subject that are finely detailed, such as hair. The segmenter 204 may use the image matting to predict the foreground color in each pixel and remove background color from mixed pixels to obtain a more natural looking stitch between segmented subjects that are added to an image.

In some embodiments, one or more segmented subjects are generated based on generating superpixels for the image and matching superpixel centroids to depth map values (e.g., obtained by the camera 243 using a depth sensor or by deriving depth from pixel values) to cluster detections based on depth. More specifically, depth values in a masked area may be used to determine a depth range and superpixels may be identified that fall within the depth range. Another technique for generating a segmented subject includes weighing depth values based on how close the depth values are to the segmented subject where weights are represented by a distance transform map.

In some embodiments, the segmenter 204 uses a machine-learning algorithm, such as a neural network or more specifically, a convolutional neural network, to segment the input image. The segmenter 204 may specify a circuit configuration (e.g., for a programmable processor, for a field programmable gate array (FPGA), etc.) enabling processor 235 to apply a segmenter machine-learning model. In some embodiments, the segmenter 204 includes software instructions, hardware instructions, or a combination. In some embodiments, the segmenter 204 may offer an application programming interface (API) that can be used by the operating system 262 and/or other applications 264 to invoke the segmenter 204 e.g., to apply the machine-learning model to application data 266 to output the segmented subject.

The segmenter 204 uses training data to generate a trained machine-learning model. For example, training data may include pairs of input images with one or more objects and output images with one or more corresponding segmented subjects.

Training data may be obtained from any source, e.g., a data repository specifically marked for training, data for which permission is provided for use as training data for machine learning, etc. In some embodiments, the training may occur on the media server 101 that provides the training data directly to the user device 115, the training occurs locally on the user device 115, or a combination of both.

In some embodiments, the segmenter 204 uses weights that are taken from another application and are unedited/transferred. For example, in these embodiments, the trained model may be generated, e.g., on a different device, and be provided as part of the segmenter 204. In various embodiments, the trained model may be provided as a data file that includes a model structure or form (e.g., that defines a number and type of neural network nodes, connectivity between nodes and organization of the nodes into a plurality of layers), and associated weights. The segmenter 204 may read the data file for the trained model and implement neural networks with node connectivity, layers, and weights based on the model structure or form specified in the trained model.

The trained machine-learning model may include one or more model forms or structures. For example, model forms or structures can include any type of neural-network, such as a linear network, a deep-learning neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as frames in a video, pixels in an image, etc. and produces as output a result sequence), etc.

The model form or structure may specify connectivity between various nodes and organization of nodes into layers. For example, nodes of a first layer (e.g., an input layer) may receive data as input data or application data. Such data can include, for example, one or more pixels per node, e.g., when the trained model is used for analysis, e.g., of an input image. Subsequent intermediate layers may receive as input, output of nodes of a previous layer per the connectivity specified in the model form or structure. These layers may also be referred to as hidden layers. For example, a first layer may output a segmentation between a foreground and a background. A final layer (e.g., output layer) produces an output of the machine-learning model. For example, the output layer may receive the segmentation of the input image into a foreground and a background and output whether a pixel is part of a subject or the rest of the input image. In some embodiments, the model form or structure also specifies a number and/or type of nodes in each layer.

In different embodiments, the trained model can include one or more models. One or more of the models may include a plurality of nodes, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some embodiments, the computation performed by a node may also include applying a step/activation function to the adjusted weighted sum. In some embodiments, the step/activation function may be a nonlinear function. In various embodiments, such computation may include operations such as matrix multiplication. In some embodiments, computations by the plurality of nodes may be performed in parallel, e.g., using multiple processors cores of a multicore processor, using individual processing units of a graphics processing unit (GPU), or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM).

In some embodiments, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using training data, to produce a result.

Training may include applying supervised learning techniques. In supervised learning, the training data can include a plurality of inputs (e.g., input images) and a corresponding groundtruth output for each input (e.g., a groundtruth segmented image that correctly identifies the subject in each image). Based on a comparison of the segmented subject output by the model with the groundtruth image, values of the weights are automatically adjusted, e.g., in a manner that increases a probability that the model produces the groundtruth image for the input image.

In various embodiments, a trained model includes a set of weights, or embeddings, corresponding to the model structure. In some embodiments, the trained model may include a set of weights that are fixed, e.g., downloaded from a server that provides the weights. In various embodiments, a trained model includes a set of weights, or embeddings, corresponding to the model structure. In embodiments where data is omitted, the segmenter 204 may generate a trained model that is based on prior training, e.g., by a developer of the segmenter 204, by a third-party, etc. In some embodiments, the trained model may include a set of weights that are fixed, e.g., downloaded from a server that provides the weights.

In some embodiments, the trained segmenter machine-learning model receives an input image with one or more subjects. In some embodiments, the trained machine-learning model outputs one or more segmented subjects that correspond to the one or more subjects in the input image. In some embodiments, the trained machine-learning outputs a segmentation score with the one or more segmented subjects that indicates a confidence in the segmentation process.

The composite module 206 generates a composite image that includes the one or more first subjects and the one or more second subjects. The composite module 206 warps one or more segmented subjects to be added to an image by scaling and rotating the one or more segmented subjects to align with the image. For example, the composite module 206 may use a 3×3 homography to perform the warping. In some embodiments, the segmented subjects include corresponding shadows and the composite module 206 warps the corresponding shadows. In some embodiments, the composite module 206 generates the composite image by combining a segmented warped one or more first subjects with a second image or by combining the first image with a segmented warped one or more second subjects. In some embodiments, the composite module 206 generates a composite image that includes objects that are attached to the subjects. The composite module 206 may warp one or more segmented subjects where the one or more segmented subjects are attached to objects that are also warped.

In some embodiments, the composite module 206 determines an order of the one or more first subjects and the one or more second subjects in the composite image based on the first depth and the second depth. For example, in the composite image 371 illustrated in FIG. 3H, the second subject 374 is ordered to be in front of the first subjects 372, 373. In some embodiments, the composite module 206 also determines a depth order for objects in the composite image. In some embodiments, the composite module 206 includes a machine-learning model that outputs multiple composite images with different depth orders and selects a final composite image based on a depth ordering quality score associated with each of the composite images.

The composite module 206 may receive camera parameters, such as depth, rotation and translation for the first image from the user interface module 202. The composite module 206 refines the camera parameters to produce a more accurate geometry for the merge. For example, the composite module 206 may identify a first eye distance between one or more pairs of eyes that correspond to the one or more first subjects and determine a first depth of the one or more first subjects in the first image based on the first eye distance. The composite module 206 may identify a second eye distance between one or more pairs of eyes that correspond to the one or more second subjects and determine a second depth of the one or more second subjects in the second image based on the second eye distance. In some embodiments, the composite module 206 determines whether the one or more first subjects are positioned in front or behind the one or more second subjects based on the first depth and the second depth. If the one or more first subjects have a greater depth than the one or more second subjects, the one or more first subjects are positioned behind the one or more second subjects.

In some embodiments, the composite module 206 generates a first stitching score for a first composite image based on a first image and one or more segmented second subjects and a second stitching score for a second composite image based on a second image and one or more segmented first subjects. The stitching score may be based on identifying objects in an image that make stitching more difficult (e.g., based on whether the objects occlude a subject or the subject is fully visible, based on objects that are attached to a subject), the pose of subjects (either in an image or segmented), a quality of the alignment transformation (e.g., in some examples, a bad depth estimation may result in unreasonably small or large subjects being added to an image), etc. In some embodiments, the composite module 206 may crop an image if a subject touches a boundary of the image because creating a correct geometric composite image makes the subject appear to float above and/or to the side of the boundaries. As a result, a cropped image is associated with a less favorable stitching score than a composite image where a crop was not performed. In some embodiments, the stitching score is based on detection of a potentially offensive result, such as adding a subject to a composite image where their hands are placed in inappropriate locations. The composite module 206 may select the first composite image or the second composite image based on which composite image is associated with a higher stitching score.

In some embodiments, the composite module 206 generates the composite image based on receiving an indication from the segmenter 204 that the one or more first subjects are in the foreground.

In some embodiments, the composite module 206 identifies one or more objects and/or people that occlude one or more first subjects or one or more second subjects. If a subject is occluded by an object, the composite module 206 generates an intermediate image that combines the first image with a segmented second subject (or a second image with a segmented first subject) that may result in gaps in pixels next to the one or more objects. When this occurs, the composite module 206 determines if there are gaps in pixels. In this case, the composite module 206 uses an inpainter model to in-paint the gaps.

The inpainter model receives the first image, the second image, and an intermediate image as input. The inpainter model uses pixels from the first image and/or the second image to fill in the gaps in the composite image and outputs an output image. In some embodiments, the inpainter model is an inpainter machine-learning model.

In some embodiments, one or more of the first subjects or one or more of the second subjects has a partial body instead of a full body. The user interface may instruct the user to capture the second image with the user device 115 by tilting the user device or capturing a second image that is higher and rotated as compared to the previous pose of the user device 115 associated with capture of the first image to show more of the partial body as compared to the first image. The composite module 206 may generate an intermediate image that combines the first image with a segmented second subject (or a second image with a segmented first subject). In some embodiments, the second image and the intermediate image are provided as input to the inpainter model, which uses pixels from the second image to fill in gaps of pixels for the partial body and outputs the composite image. In some embodiments, instead of using inpainting to fill in the gaps, the composite module generates a composite image that is cropped to remove the gaps.

In some embodiments, the composite module 206 provides an input image as input to a machine-learning model (such as an inpainter model) and the machine-learning model outputs an output image that has one or more extended boundaries. For example, the composite module 206 may receive a determination from the user interface module 202 that an image does not have enough room to fit additional subjects. The composite module 206 may provide the input image and instruct the machine-learning model to output an intermediate image with dimensions that accommodate adding one or more subjects. The machine-learning model outputs an intermediate image that extends one or more boundaries of the input image and includes filled in pixels between the one or more boundaries of the first image and one or more boundaries of the intermediate image. The composite module 206 generates the composite image by adding one or more subjects to the intermediate image.

Example Flowchart

Figure 8:
FIG. 8 illustrates a flowchart of an example method to generate a composite image, according to some embodiments described herein.
Figure 8:
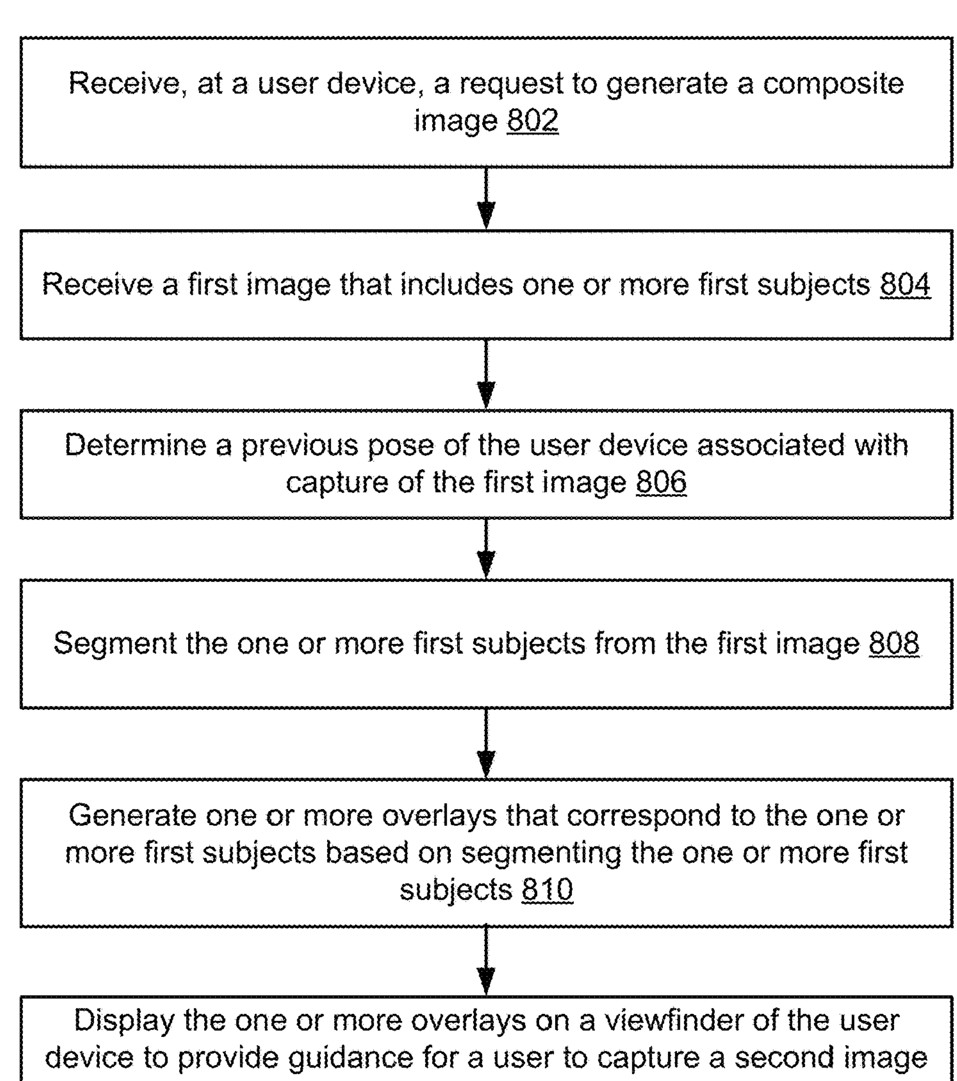

FIG. 8 illustrates an example flowchart of a method 800 to generate a composite image. The method 800 may be performed by the computing device 200 in FIG. 2. In some embodiments, the method 800 is performed by the user device 115, the media server 101, or in part on the user device 115 and in part on the media server 101.

The method 800 of FIG. 8 may begin at block 802. At block 802, a user device 115 receives a request to generate a composite image. In some embodiments, before the request to generate the composite image is received, the method 800 further includes searching an image library associated with the user device to identify the second image with the one or more second subjects that are missing from the first image and responsive to identifying the second image with the one or more second subjects that are missing from the first image, generating a user interface that includes an option to request the composite image to be generated by combining the first image and the second image. Block 802 may be followed by block 804.

At block 804, a first image is received that includes one or more first subjects. Block 804 may be followed by block 806.

At block 806, a previous pose of the user device associated with capture of the first image is determined.

At block 808, the one or more first subjects are segmented from the first image. In some embodiments, one or more objects attached to the one or more first subjects are also segmented. In some embodiments, a background and a foreground of the first image are segmented and the or more first subjects are determined to be in the foreground, where the one or more overlays and the composite image are generated based on the one or more first subjects being in the foreground. Block 806 may be followed by block 810.

At block 810, one or more overlays are generated that correspond to the one or more first subjects based on segmenting the one or more first subjects. In some embodiments, the method further includes determining one or more first depths of the one or more first subjects in the image, where the one or more overlays are displayed and the composite image is generated based on the one or more first depths. For example, the one or more overlays may be the same depth as the one or more first subjects. In some embodiments, the method 800 further includes guiding a user to capture the second image by tilting the user device as compared to the previous pose of the user device associated with capture of the first image.

In addition to the one or more overlays, a frame may be displayed that changes responsive to the comparison of the current pose of the user device to the previous pose of the user device, where the frame is placed at a third depth based on the one or more first depths of the one or more first subjects in the first image and where the frame includes a width and a height that are in correspondence with the viewfinder. Block 810 may be followed by block 812.

At block 812, the overlay is displayed on a viewfinder of the user device to provide guidance for a user to capture a second image based on a comparison of a current pose of the user device to the previous pose of the user device, wherein the second image includes one or more second subjects. Block 812 may be followed by block 814.

At block 814, a composite image is generated that includes the one or more first subjects and the one or more second subjects. For example, the composite image may be generated from the first image and a segmented one or more second subjects. In some embodiments, the method further includes determining one or more second depths of the one or more second subjects in the second image and determining an order of the one or more first subjects and the one or more second subjects in the composite image based on one or more selected from a group of the one or more first depths, the one or more second depths, and an output from a machine-learning model, wherein the composite image includes the one or more first subjects in front of the one or more second subjects based on the order.

In some embodiments, composite image is a first composite image that includes the one or more segmented first subjects added to the second image and the method 800 further includes determining a first stitching score for the first composite image, segmenting the one or more second subjects from the second image, generating a second composite image by adding the one or more segmented second subjects to the first image, determining a second stitching score for the second composite image, and providing the first composite image to the user based on the first stitching score being greater than the second stitching score.

In some embodiments, the composite image is generated by generating an intermediate image that combines the one or more segmented first subjects with the second image, identifying one or more objects that occlude the one or more first subjects or the one or more second subjects in the intermediate image, responsive to identifying the one or more objects that occlude, determining if one or more gaps are present in the intermediate image, and responsive to determining that one or more gaps are present, generating the composite image by inpainting the one or more gaps. In some embodiments, generating the composite image includes providing the second image as input to a machine-learning model; outputting, with the machine-learning model, an intermediate image that extends one or more boundaries of the second image and includes filled in pixels between the one or more boundaries of the second image and one or more boundaries of the intermediate image; and combining the intermediate image with the one or more segmented first subjects to form the composite image.

FIG. 9 illustrates a flowchart of another example method 900 to generate a composite image, according to some embodiments described herein. The method 900 may be performed by the computing device 200 in FIG. 2. In some embodiments, the method 900 is performed by the user device 115, the media server 101, or in part on the user device 115 and in part on the media server 101.

The method 900 of FIG. 8 may begin at block 902. At block 902, a first image is received that includes one or more first subjects. Block 902 may be followed by block 904.

At block 904, the one or more first subjects are segmented from the first image. Block 904 may be followed by block 906.

At block 906, a second image is received that includes one or more second subjects. Block 906 may be followed by block 908.

At block 908, responsive to at least one determination occurring, a suggestion is provided to add the one or more second subjects to the first image. The at least one determination is selected from the group of: a determination that the one or more first subjects are missing from the second image; a determination that a segmentation score generated by segmenting the one or more first subjects from the first image exceeds a threshold segmentation value; a determination that the second image includes space to fit the one or more first subjects; a determination that a stitching score associated with the second image exceeds a threshold segmentation value; and combinations thereof. Block 908 may be followed by block 910.

At block 910, responsive to receiving a selection of the suggestion, a composite image is generated that includes the one or more first subjects and the one or more second subjects.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:

receiving, at a user device, a request to generate a composite image;

receiving a first image that includes one or more first subjects;

determining a previous pose of the user device associated with capture of the first image;

segmenting the one or more first subjects from the first image;

determining one or more first depths of the one or more first subjects;

generating one or more overlays that correspond to the one or more first subjects based on segmenting the one or more first subjects;

displaying the one or more overlays on a viewfinder of the user device to provide guidance for a user to capture a second image based on a comparison of a current pose of the user device to the previous pose of the user device, wherein the second image includes one or more second subjects; and generating the composite image that includes the one or more first subjects and the one or more second subjects, wherein the composite image is generated based on the one or more first depths.

2. The method of claim 1, further comprising:

determining one or more second depths of the one or more second subjects in the second image; and determining an order of the one or more first subjects and the one or more second subjects in the composite image based on one or more selected from a group of the one or more first depths, the one or more second depths, and an output from a machine-learning model, wherein the composite image includes the one or more first subjects in front of the one or more second subjects based on the order.

3. The method of claim 1, further comprising:

displaying a frame that changes responsive to the comparison of the current pose of the user device to the previous pose of the user device;

wherein the frame is placed at a third depth based on the one or more first depths of the one or more first subjects in the first image; and wherein the frame includes a width and a height that are in correspondence with the viewfinder.

4. The method of claim 1, further comprising:

before generating the one or more overlays, segmenting a background and a foreground of the first image; and determining that the one or more first subjects are in the foreground, wherein the one or more overlays and the composite image are generated based on the one or more first subjects being in the foreground.

5. The method of claim 1, wherein the composite image is a first composite image that includes the one or more segmented first subjects added to the second image and the method further comprises:

determining a first stitching score for the first composite image;

segmenting the one or more second subjects from the second image;

generating a second composite image by adding the one or more segmented second subjects to the first image;

determining a second stitching score for the second composite image; and providing the first composite image to the user based on the first stitching score being greater than the second stitching score.

6. The method of claim 1, wherein segmenting the one or more first subjects from the first image further includes segmenting one or more objects attached to the one or more first subjects.

7. The method of claim 1, wherein generating the composite image includes:

generating an intermediate image that combines the one or more segmented first subjects with the second image;

identifying one or more objects that occlude the one or more first subjects or the one or more second subjects in the intermediate image;

responsive to identifying the one or more objects that occlude, determining if one or more gaps are present in the intermediate image; and responsive to determining that one or more gaps are present, generating the composite image by inpainting the one or more gaps.

8. The method of claim 1, wherein generating the composite image includes:

providing the second image as input to a machine-learning model;

outputting, with the machine-learning model, an intermediate image that extends one or more boundaries of the second image and includes filled in pixels between the one or more boundaries of the second image and one or more boundaries of the intermediate image; and combining the intermediate image with the one or more segmented first subjects to form the composite image.

9. The method of claim 1, further comprising:

guiding the user to capture the second image by tilting the user device as compared to the previous pose of the user device associated with capture of the first image.

10. The method of claim 1, wherein prior to receiving the request to generate the composite image, the method further comprises:

searching an image library associated with the user device to identify the second image with the one or more second subjects that are missing from the first image; and responsive to identifying the second image with the one or more second subjects that are missing from the first image, generating a user interface that includes an option to request the composite image to be generated by combining the first image and the second image.

11. A system comprising:

one or more processors; and a memory that stores instructions that, when executed by the one or more processors cause the one or more processors to perform operations comprising:

receiving, at a user device, a request to generate a composite image;

receiving a first image that includes one or more first subjects;

determining a previous pose of the user device associated with capture of the first image;

segmenting the one or more first subjects from the first image;

determining one or more first depths of the one or more first subjects;

generating one or more overlays that correspond to the one or more first subjects based on segmenting the one or more first subjects;

displaying the one or more overlays on a viewfinder of the user device to provide guidance for a user to capture a second image based on a comparison of a current pose of the user device to the previous pose of the user device, wherein the second image includes one or more second subjects; and generating the composite image that includes the one or more first subjects and the one or more second subjects, wherein the composite image is generated based on the one or more first depths.

12. The system of claim 11, wherein the operations further include:

determining one or more second depths of the one or more second subjects in the second image; and determining an order of the one or more first subjects and the one or more second subjects in the composite image based on one or more selected from a group of the one or more first depths, the one or more second depths, and an output from a machine-learning model, wherein the composite image includes the one or more first subjects in front of the one or more second subjects based on the order.

13. The system of claim 11, wherein the operations further include:

displaying a frame that changes responsive to the comparison of the current pose of the user device to the previous pose of the user device;

wherein the frame is placed at a third depth based on the one or more first depths of the one or more first subjects in the first image; and wherein the frame includes a width and a height that are in correspondence with the viewfinder.

14. A non-transitory computer-readable medium with instructions stored thereon that, when executed by one or more computers, cause the one or more computers to perform operations, the operations comprising:

receiving, at a user device, a request to generate a composite image;

receiving a first image that includes one or more first subjects;

determining a previous pose of the user device associated with capture of the first image;

segmenting the one or more first subjects from the first image;

determining one or more first depths of the one or more first subjects;

generating one or more overlays that correspond to the one or more first subjects based on segmenting the one or more first subjects;

displaying the one or more overlays on a viewfinder of the user device to provide guidance for a user to capture a second image based on a comparison of a current pose of the user device to the previous pose of the user device, wherein the second image includes one or more second subjects; and generating the composite image that includes the one or more first subjects and the one or more second subjects, wherein the composite image is generated based on the one or more first depths.

15. The non-transitory computer-readable medium of claim 14, wherein the operations further include:

determining one or more second depths of the one or more second subjects in the second image; and determining an order of the one or more first subjects and the one or more second subjects in the composite image based on one or more selected from a group of the one or more first depths, the one or more second depths, and an output from a machine-learning model, wherein the composite image includes the one or more first subjects in front of the one or more second subjects based on the order.

16. The non-transitory computer-readable medium of claim 14, wherein the operations further include:

displaying a frame that changes responsive to the comparison of the current pose of the user device to the previous pose of the user device;

wherein the frame is placed at a third depth based on the one or more first depths of the one or more first subjects in the first image; and wherein the frame includes a width and a height that are in correspondence with the viewfinder.

17. The non-transitory computer-readable medium of claim 14, wherein the operations further include:

before generating the one or more overlays, segmenting a background and a foreground of the first image; and determining that the one or more first subjects are in the foreground, wherein the one or more overlays and the composite image are generated based on the one or more first subjects being in the foreground.

* * * * *